United States Patent
Tseng et al.

(10) Patent No.: US 7,760,216 B2
(45) Date of Patent: Jul. 20, 2010

(54) SHEET FEEDING MECHANISM WITH DUPLEX PRINT FUNCTION AND RELATED PRINTER

(75) Inventors: Min-Chih Tseng, Kaohsiung County (TW); Chi-Chien Lin, Taipei County (TW); Chiung-Yi Su, Taipei County (TW); Wen-Chung Lo, Hsinchu (TW)

(73) Assignee: Lite-On Technology Corp., Taipei (TW)

( * ) Notice: Subject to any disclaimer, the term of this patent is extended or adjusted under 35 U.S.C. 154(b) by 379 days.

(21) Appl. No.: 11/971,216

(22) Filed: Jan. 9, 2008

(65) Prior Publication Data

US 2009/0059313 A1  Mar. 5, 2009

(30) Foreign Application Priority Data

Sep. 5, 2007 (TW) .............................. 96214881 U

(51) Int. Cl.
*B41J 3/60* (2006.01)
*G03G 15/23* (2006.01)
*G03G 15/24* (2006.01)

(52) U.S. Cl. .................. 347/139; 347/262; 347/264; 399/401

(58) Field of Classification Search .......... 347/101, 347/139, 218, 262, 264; 399/397, 401
See application file for complete search history.

(56) References Cited

U.S. PATENT DOCUMENTS

| 4,806,979 | A | 2/1989 | Tokoro et al. |
| 6,185,381 | B1 | 2/2001 | Nakahara et al. |
| 6,618,577 | B2 | 9/2003 | Omura |
| 6,782,236 | B2 * | 8/2004 | Sasaki et al. ................. 399/401 |
| 7,386,964 | B2 * | 6/2008 | Kuru et al. ..................... 53/54 |
| 2003/0063936 | A1 * | 4/2003 | Sasaki et al. ................. 399/401 |
| 2003/0190179 | A1 * | 10/2003 | Kinoshita et al. ........... 399/401 |
| 2007/0092320 | A1 * | 4/2007 | Taniguchi et al. ........... 399/381 |

* cited by examiner

*Primary Examiner*—Huan H Tran
(74) *Attorney, Agent, or Firm*—Rosenberg, Klein & Lee

(57) ABSTRACT

A sheet feeding mechanism having a pickup roller, a switch device, and a gear set is disclosed. The pickup roller drives a recording material to a first path, and the recording material proceeds from the first path to a second path or from a third path to a fourth path when the switch device is switched to a first position, and proceeds from the first path to the third path when the switch device is switched to a second position. The gear set drives the recording material from the first path to the third path when the switch device is switched to the second position and drives the recording material from the first path to the second path, from the third path to the fourth path, and from the fourth path to the first path when the switch device is switched to the first position.

17 Claims, 7 Drawing Sheets

SHEET FEEDING MECHANISM WITH DUPLEX PRINT FUNCTION AND RELATED PRINTER

BACKGROUND OF THE INVENTION

1. Field of the Invention

The invention relates to a sheet feeding mechanism and related printer thereof, and more particularly, to a sheet feeding mechanism with duplex print function and related printer thereof.

2. Description of the Prior Art

In the prior art technology, when a user wishes to perform a printing operation on an unprinted side of a printing media the operation is performed with a single-sided media printer. Specifically, the printing media, having the unprinted side facing up, is fed by the user into the single-sided media printer so that printing on the unprinted side of the printing media can be performed. However, when a user wishes to perform printing on both sides of a printing media (i.e., double sided printing) the operation requires significant user intervention. Specifically, a printed side of the printing media must be reversed manually by the user so that an unprinted side of the printing media faces up. Thereby printing on the unprinted side of the printing media can be performed, and the requirement of printing on both sides (double sides) of the printing media is achieved. When the volume of the desired printing media to be generated in a double-sided fashion is smaller, the time consumed by the user for manually reversing a printed side of the printing media is acceptable. However, when the volume of printing media to be printed in a double-sided fashion is larger, the time consumed by the user for manually reversing a printed side of the printing media thereby performing double-sided printing increases significantly as compared to the time consumed for performing single-sided printing. Therefore, the inconvenient to the users is much greater.

The amount of time and the labor consumed by performing double-sided printing with single-sided media printers is inconvenient. Additionally, since the printing media is reversed manually while the single-sided media printer performing the double-sided printing, the unprinted second side of the printing media easily deviates from a designated position for printing. Therefore, the patterns of both sides of the printing media are inconsistent with each other. This results in the necessity of reprint the double-sided printing causing a waste in the consumed printing media.

In recent years, printers having duplex print function have gradually become the dominant product in the market. U.S. Pat. Nos. 6,185,381, 6,618,577, 4,806,979 disclose printers having duplex print function, which are typically accomplished by using discharge rollers to retract printing media in a reverse manner for performing the double sided printing. For instance, after one side of the printing media is printed, the printing media are retracted and another printing is performed on the unprinted side of the printing media. In other words, the printing performed on one printing medium must be completed before another printing is performed on the next printing medium, which ultimately decreases the overall printing speed and reduces the efficiency of the printer.

SUMMARY OF THE INVENTION

It is an objective of the present invention to provide a sheet feeding mechanism with duplex print function and related printer thereof to solve the aforementioned problem.

A sheet feeding mechanism with duplex print function is disclosed. The sheet feeding mechanism includes: a pickup roller for driving a recording material to a first path; a switch device, wherein the recording material proceeds from the first path to a second path or from a third path to a fourth path when the switch device is switched to a first position, and proceeds from the first path to the third path when the switch device is switched to a second position; and a gear set for driving the recording material from the first path to the third path when the switch device is switched to the second position and driving the recording material from the first path to the second path, from the third path to the fourth path, and from the fourth path to the first path when the switch device is switched to the first position.

According to another aspect of the present invention, a printer with duplex print function is disclosed. The printer includes: a casing; a pickup roller installed in the casing for driving a recording material to a first path; a developing system installed in the casing for transferring toner to the recording material along the first path; a toner fuser installed in the casing for fusing the toner on the recording material along the first path; and a sheet feeding mechanism installed in the casing. The sheet feeding mechanism further includes: a switch device, wherein the recording material proceeds from the first path to a second path or from a third path to a fourth path when the switch device is switched to a first position, and proceeds from the first path to the third path when the switch device is switched to a second position; and a gear set for driving the recording material from the first path to the third path when the switch device is switched to the second position and driving the recording material from the first path to the second path, from the third path to the fourth path, and from the fourth path to the first path when the switch device is switched to the first position.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
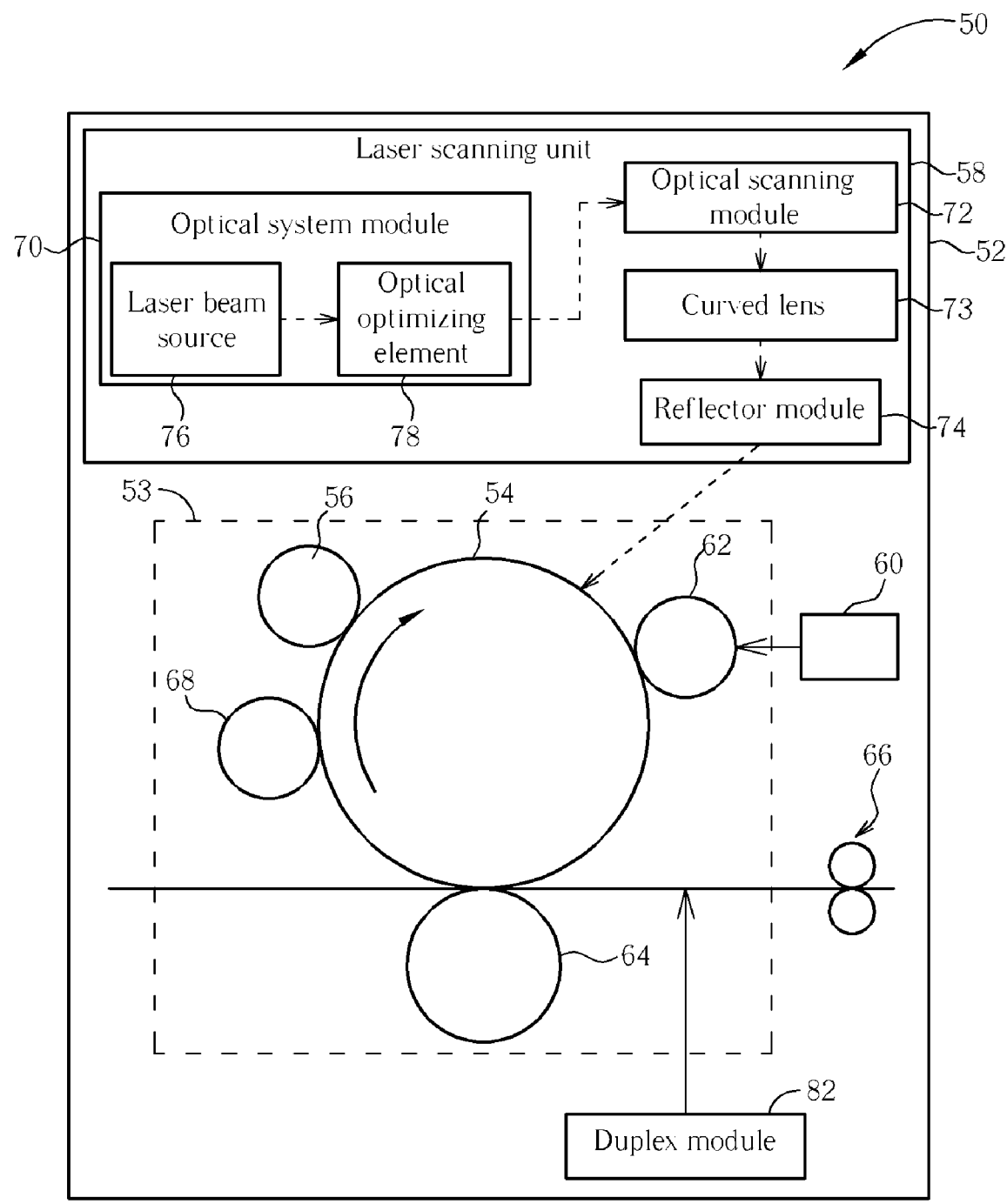
FIG. 1 illustrates a schematic view of a printer according to the present invention.

Referring to FIG. 1, FIG. 1 illustrates a schematic view of a printer 50 according to the present invention. The printer 50 includes a casing 52 for accommodating internal parts of the printer 50 and a developing system 53 for transferring toner to a recording material 51. The developing system 53 includes an organic photo conductor 54 installed in the casing 52 in a rotatable manner and a charged roller 56 installed in the casing 52 for distributing charges to the organic photo conductor 54. A laser scanning unit 58 is installed in the casing 52 for projecting laser beams to the organic photo conductor and a toner cartridge 60 is installed in the casing 52 for storing toner. A developer roller 62 installed inside the casing 12 and disposed on one side of the toner cartridge 60 is capable of absorbing toners from the toner cartridge 60, and a transfer roller 64 is installed in the casing 52 and electrically connected to a negative biasing voltage (not shown). A toner fuser 66 is installed in the casing 52 for melting a plastic portion of the toner so as to fuse the toners on the recording material 51. A discharge unit 68 is installed inside the casing 52 for discharging charges from the organic photo conductor 54.

The printing procedures and principles of the laser printer 50 are introduced below. First, the charged roller 56 distributes electrons and positive charges on the surface of the organic photo conductor 54. Then, the laser scanning unit 58 projects laser beams onto a specific region of the surface of the organic photo conductor 54. The organic photo conductor 54 is composed of highly-photoconductive material. When the specific region of the surface of the organic photo conductor 54 receives the laser beams emitted from the laser scanning unit 58, the collisions between photons of the laser beams and electrons of the highly-photoconductive material ionize the electrons and make the specific region conductive, so as to form an electrostatic image with lower voltage. Voltage at a position of the electrostatic image is related to the frequency of the laser beam. In other words, the higher the frequency of the laser beam projected onto a point, the lower the voltage of the point, and vice versa. Subsequently, when the organic photo conductor 54 rotates to a position where the electrostatic image is adjacent to the developer roller 62, because the developer roller 62 has already absorbed charged toners stored in the toner cartridge 60, parts of the electrostatic image of certain voltages will absorb the charged toners from the developer roller 62. The lower the voltage of a point on the electrostatic image is, the more charged toner the point will absorb. Next, when the organic photo conductor 54 rotates to a position where the electrostatic image is adjacent to the transfer roller 64, because the negative bias the transfer roller 64 is electrically connected to is much lower than the voltage at any position on the electrostatic image (meaning the absolute value of the minus bias is greater than the absolute value of the voltage at any position on the electrostatic image), the transfer roller 64 is able to transfer the charged toners on the electrostatic image to the print medium 51 between the transfer roller 64 and the organic photo conductor 54. At this time, the toners stay on the print medium 51 temporarily because of the attraction of static electricity, and therefore any vibration of the laser printer 50 or other external forces will shift the toner on the print medium 51. But after the print medium 51 passes through the toner fuser 66, the heat generated by the toner fuser 66 will melt the plastic portion of the toners on the print medium 51 so as to make the toners stick to the print medium 51. After the transfer roller 64 transfers the toners on the electrostatic image to the print medium 51, and the organic photo conductor 54 rotates to a position where the electrostatic image is adjacent to the discharge unit 68, the discharge unit 68 will discharge the charges from the electrostatic image completely, so that when the organic photo conductor 54 rotates to a specific region (the electrostatic image has already disappeared) adjacent to the charged roller 56, the charged roller 56 is able to redistribute charges on the surface of the organic photo conductor 54. In addition, the laser scanning unit 58 includes an optical system module 70, an optical scanning module 72, a curved lens 73, and a reflector module 74. The optical system module 70 generating laser beams according to print data includes a laser beam source 76 for emitting the laser beams, and an optical optimizing element 78 for optimizing the laser beams emitted from the laser beam source 76. The optical scanning module 72 is for reflecting the laser beams generated by the optical system module 70. The curved lens 73 for reflecting the laser beams reflected from the optical scanning module 72 can be an f-θ lens. The reflector module 74 is for reflecting the laser beams reflected from the curved lens 73 to the organic photo conductor 74.

Figure 2:
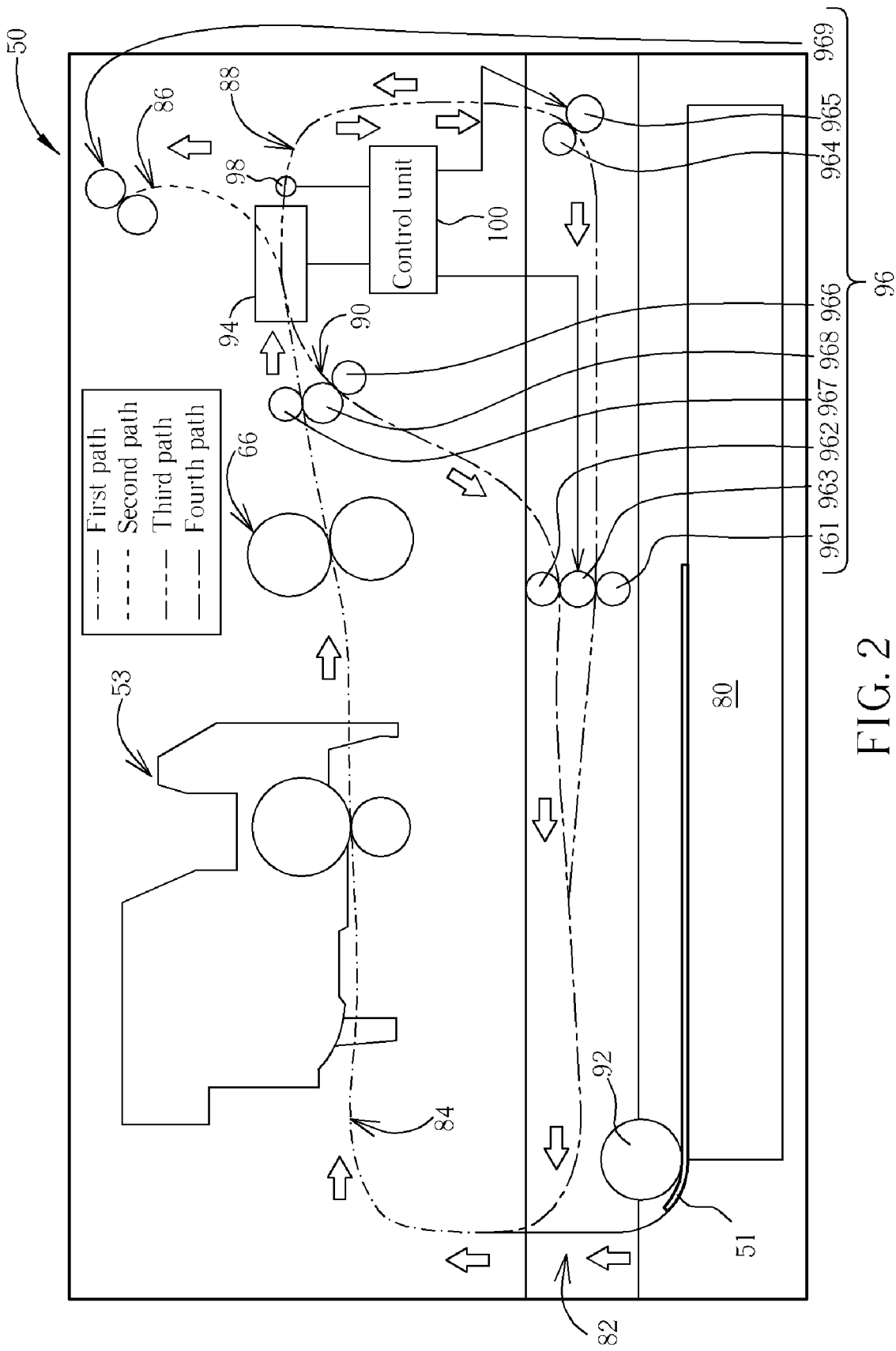
FIG. 2 is a diagram illustrating a path of the recording material traveled within the printer according to the present invention.

Referring to FIG. 2, FIG. 2 is a diagram illustrating a path of the recording material 51 traveled within the printer 50 according to the present invention. As shown in FIG. 2, a detachable tray 80 used for storing the recording material 51 is installed in the casing 52. A sheet feeding mechanism having a duplex module 82 is also installed in the casing 52. The duplex module 82 is preferably a detachable module, which can be purchased separately or installed directly in the printer 50. The path traveled by the recording material 51 includes a first path 84, a second path 86, a third path 88, and a fourth path 90. The sheet feeding mechanism further includes a pickup roller 92, a switch device 94, and a gear set 96. The pickup roller 92 installed in a rotatable manner above the tray 80 is used to pick up the recording material 51 from the tray 80 and drive it to the first path 84. The switch device 94 is used to switch between a first position and a second position, in which the switch device 94 is preferably a switch gate. The gear set 96 is used to drive the recording material 51.

The gear set 96 includes a first pinch roller 961 installed in a rotatable manner on one side of the third path 88; a second pinch roller 962 installed in a rotatable manner on one side of the fourth path 90; a first capstan roller 963 installed in a rotatable manner between the third path 88 and the fourth path 90 and connected to the first pinch roller 961 and the second pinch roller 962, in which the first capstan roller 963 drives the first pinch roller 961 and the second pinch roller 962; a third pinch roller 964 installed in a rotatable manner on one other side of the third path 88; a second capstan roller 965 installed in a rotatable manner on the side of the third path 88 and connected to the third pinch roller 964, in which the second capstan roller 965 drives the third pinch roller 964; a fourth pinch roller 966 installed in a rotatable manner on one other side of the fourth path 90; a fifth pinch roller 967 installed in a rotatable manner on one side of the first path 84; and a third capstan roller 968 installed in a rotatable manner between the first path 84 and the fourth path 90 and connected to the fourth pinch roller 966 and the fifth pinch roller 967, in which the third capstan roller 968 is used to drive the fourth pinch roller 966 and the fifth pinch roller 967. The gear set 96 also includes a discharge roller 969 installed in a rotatable manner on the second path 86 for discharging the recording material 51 away from the first path 84. Preferably, the first pinch roller 961, the second pinch roller 962, the first capstan roller 963, the third pinch roller 964, and the second capstan roller 965 positioned along the third path 88 are included within the duplex module 82. As stated previously, if double sided printing is not required, the duplex module 82 can be detached from the printer 50 to save overall cost of the printer 50. Conversely, if a double sided printing is required, a user only needs to install the duplex module 82 in the printer 50 to complete the printing task. Preferably, the duplex module 82 is used in conjunction with the rollers of the gears set 96, the switch device 94, and the control unit 100 to achieve a double sided printing.

Figure 3:
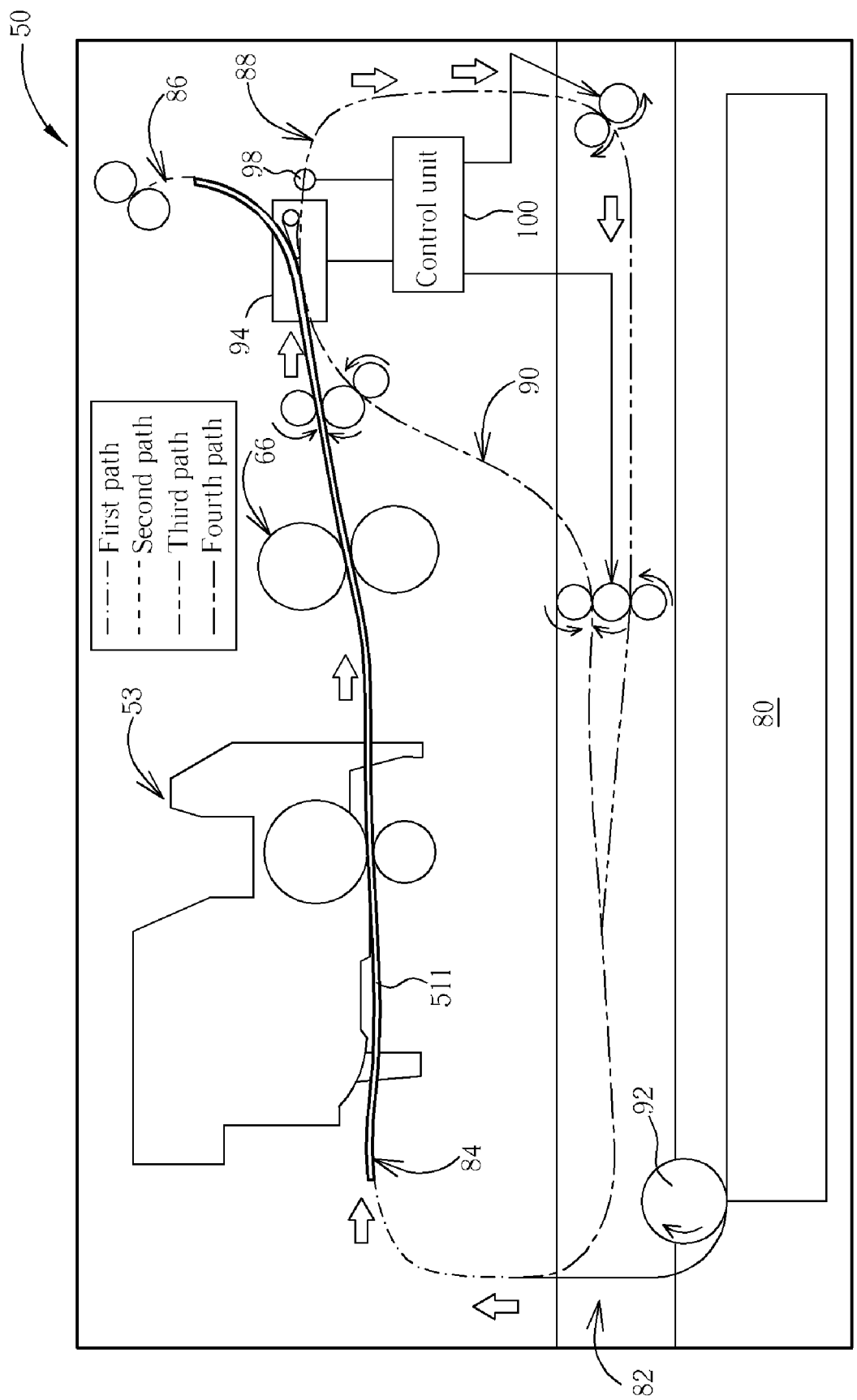
FIG. 3 is a perspective view illustrating a path of the recording material when a single sided printing is performed on the printer.

Referring to FIGS. 3-7, FIG. 3 is a perspective view illustrating a path of the recording material when a single sided printing is performed, and FIGS. 4-7 are perspective views illustrating the paths of the recording material when a double sided printing is performed continuously on the printer 50. As shown in FIG. 3, when the printer 50 prints a first recording material 511, the pickup roller 92 would pick up the first recording material 511 from the tray 80 and drive it to the first path 84. The developing system 53 then transfers toner to the first recording material 511 along the first path 84, and the toner fuser 66 fuses the toner on the first recording material 511 and completes the printing task. The third capstan roller 968 then rotates according to the direction of the arrow shown in FIG. 3 and drives the fourth pinch roller 966 and the fifth pinch roller 967 to rotate according to the direction of the arrow shown in FIG. 3 and drive the first recording material 511 to move toward the switch device 94. If a user wishes to perform a single sided printing on the recording material 511, the switch device 94 would switch to the first position shown in FIG. 3 and causing the recording material 511 to proceed from the first path 84 to the second path 86. The discharge roller 969 then takes the first recording material 511 away from the first path 84 and completes the task of single sided printing.

Figure 4:
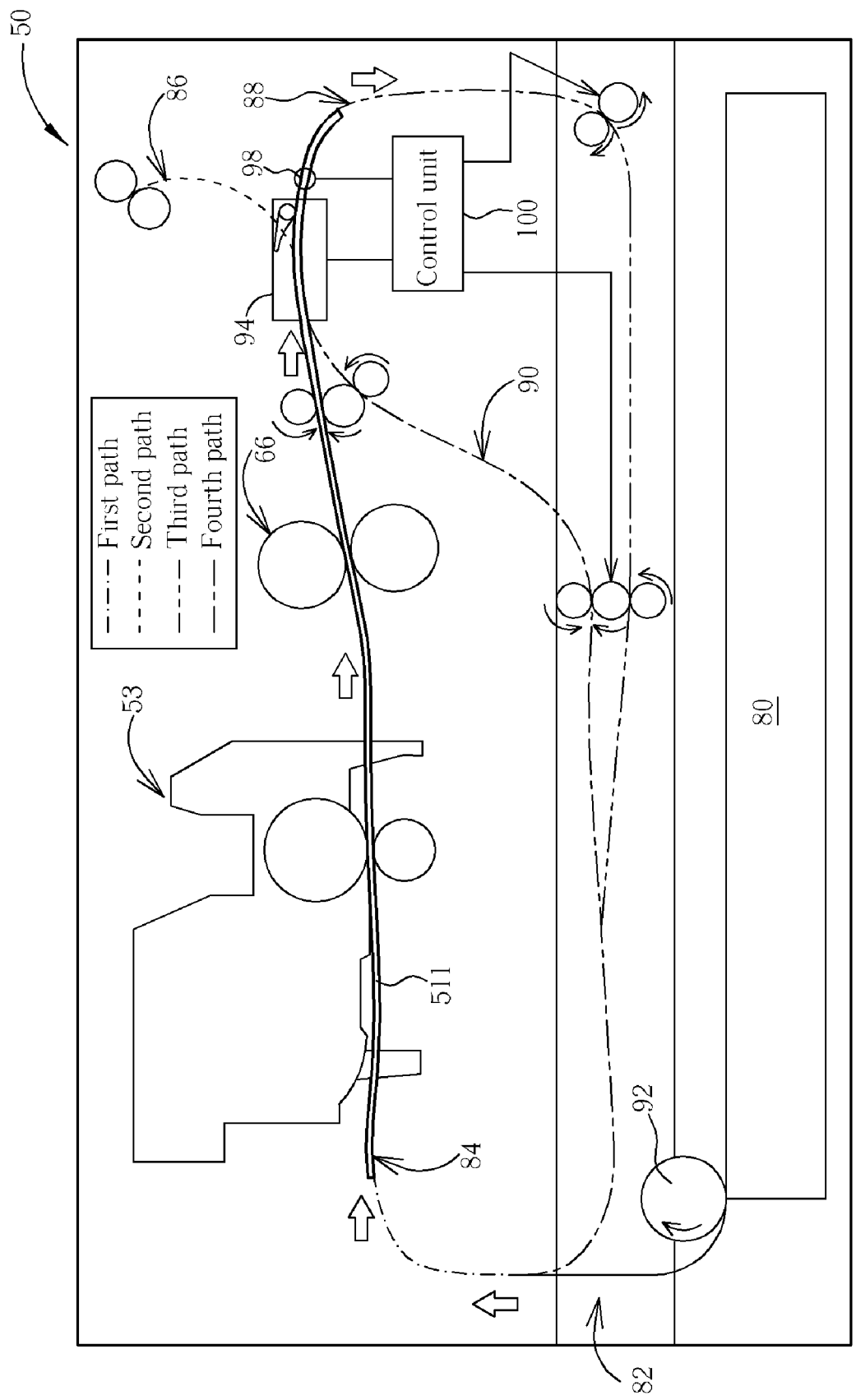
FIGS. 4-7 are perspective views illustrating the paths of the recording material when a double sided printing is performed continuously on the printer.

Referring to FIG. 4, if a double sided printing is performed, the pickup roller 92 first picks up the first recording material 511 from the tray 80 and drives it to the first path 84, the developing system 53 then transfers toner to the first recording material 511 along the first path 84, and the toner fuses 66 fuses the toner onto the first recording material 511 to complete first side printing on the first recording material 511. The third capstan roller 968 then rotates according to the direction of the arrow shown in FIG. 3 and drives the fourth pinch roller 966 and the fifth roller 967 to rotate according to the direction of the arrow shown in FIG. 3, which further drives the first recording material 511 to move toward the switch device 94. If a double sided printing is performed on the first recording material 511, the switch device 94 then switches to the second position shown in FIG. 4 to stop the first recording material 511 and switches the path of the first recording material 511 from the first path 84 to the third path 88. The second capstan roller 965 then rotates according to the direction of the arrow shown in FIG. 4 and drives the third pinch roller 964 to rotate according to the direction of the arrow shown in FIG. 4, and the first capstan roller 963 rotates according to the direction of the arrow shown in FIG. 4 and drives the first pinch roller 961 and the second pinch roller 962 to rotate according to the direction of the arrow shown in FIG. 4, thereby driving the first recording material 511 toward the direction of the third path 88.

Figure 5:
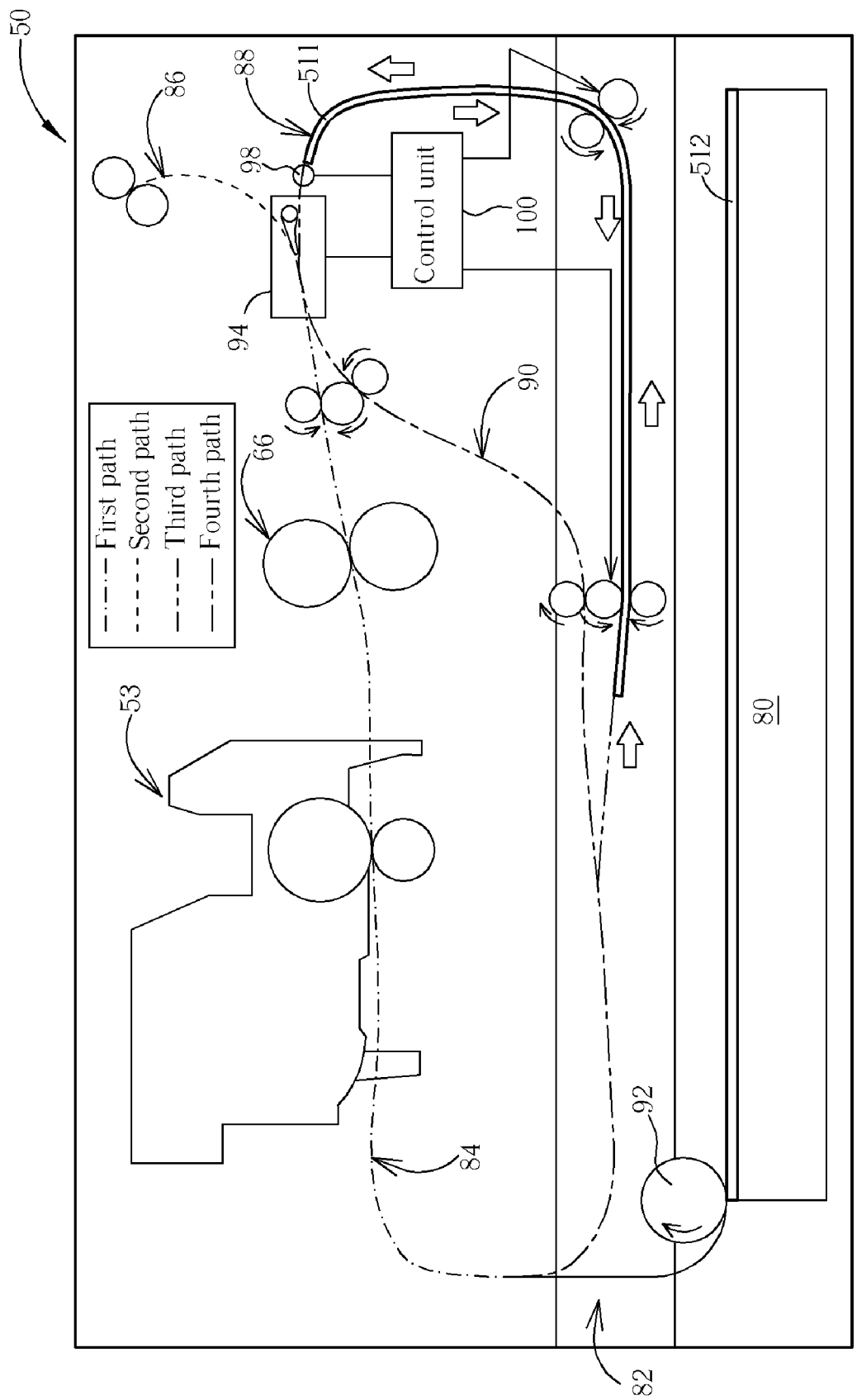

Referring to FIG. 5, the sheet feeding mechanism also includes a sensor 98 and a control unit 100. The sensor 98 is disposed on one end of the third path 88 to determine whether the first recording material 511 detaches from the switch device 94 and enters the third path 88, and the control unit 100 is electrically connected to the sensor 98 to control the gear set 96 to drive the recording material from the third path 88 to the fourth path 90 according to the sensing result of the sensor 98. After the sensor 98 senses the first recording material 511 completely detaches from the switch device 94 and enters the third path 88 (such as the end of the first recording material 511 leaves the sensor 98), the sensor 98 then transmits a corresponding signal to the control unit 100 and causes the control unit 100 to control the first capstan roller 963 and the second capstan roller 965 to invert according to the direction of the arrow shown in FIG. 5 and control the switch device 94 to switch from the second position back to the first position to stop the first recording material 511. The path of the first recording material 511 then switches from the third path 88 to the fourth path 90. As the path of the first recording material 511 changes, the end of the first recording material 511 is switched to front and guided to the fourth path 90. In the mean time, the pickup roller 92 picks up a second recording material 512 from the tray 80 and drives it to the first path 84. In addition to using the sensor 98 to sense whether the first recording material 511 detaches from the switch device 94 and enters the third path 88, a time control method can be employed by inverting the first capstan roller 963 and the second capstan roller 965 within a specific time lapse and controlling the switch device 94 to switch from the second position to the first position.

Figure 6:
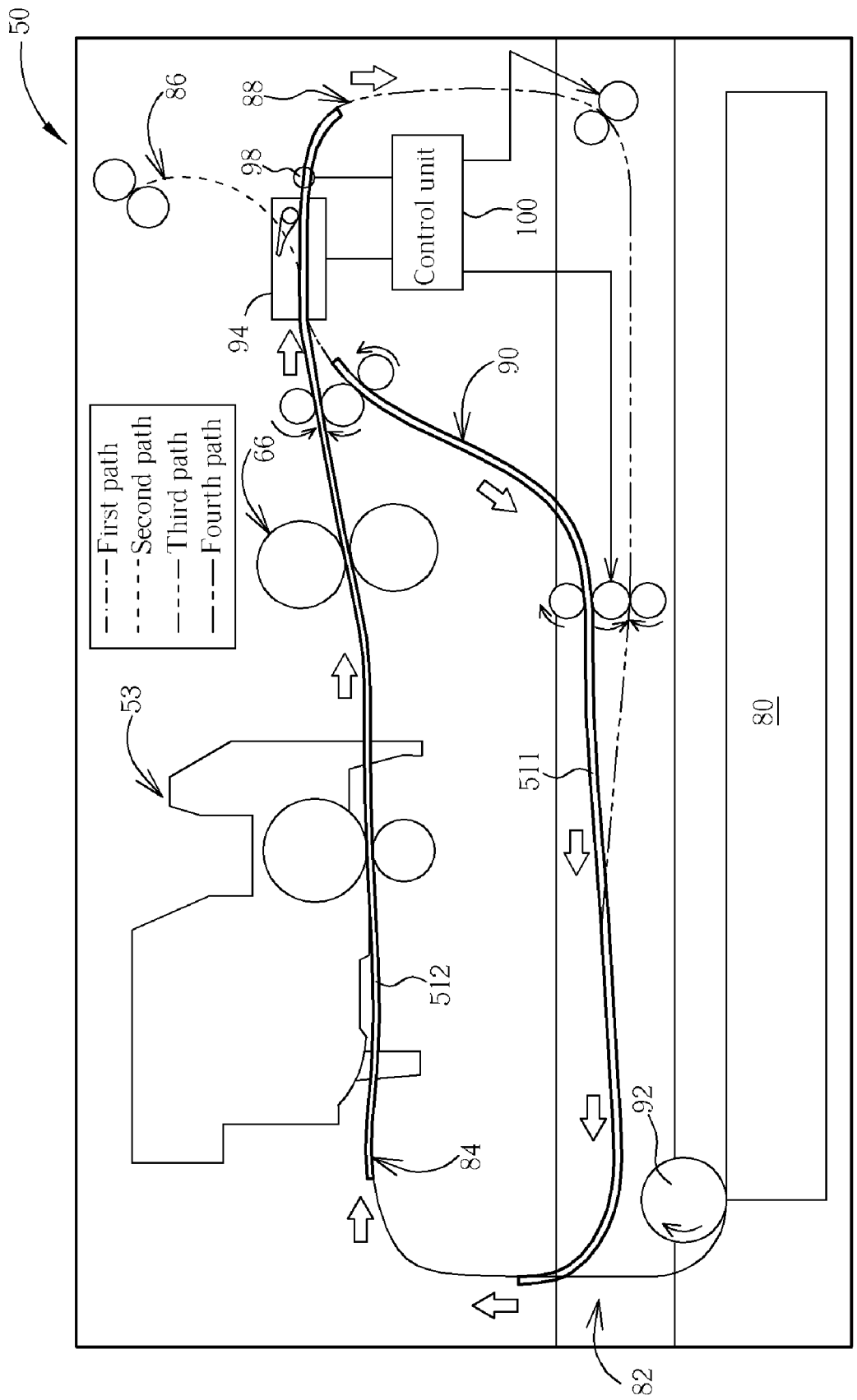
Figure 7:
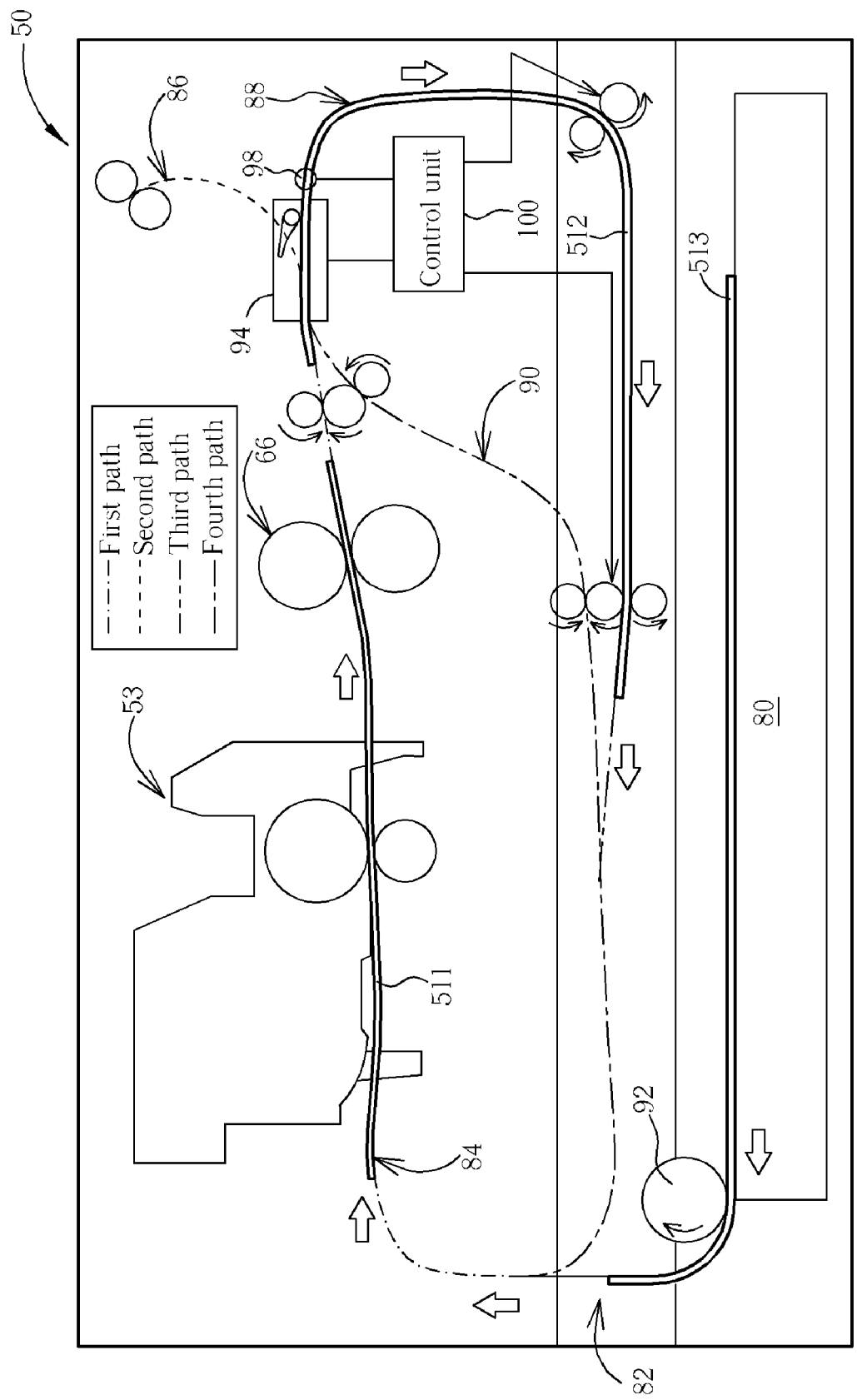

Referring to FIGS. 6-7, as the first recording material 511 proceeds along the fourth path 90, the second recording material 512 also proceeds according to the path of the first recording material 511 shown in FIG. 4 to perform a single sided printing. In other words, the first recording material 511 and the second recording material 512 are processed simultaneously in the sheet feeding mechanism. Similar to the path of the first recording material 511 shown in FIG. 5, the second recording material 512 then proceeds from the first path 84 to the third path 88. The path of the second recording material 512 from the third path 88 to the fourth path 90 is similar to the aforementioned embodiment and the details of which are not further explained herein for the sake of brevity. In the mean time, the first recording material 511 is driven from the first path 84 to the fourth path 90. As the direction of the first recording material 511 changes, the toner of the developing system 53 is transferred along the first path 84 to another side of the first recording material 511, and the toner fuser 66 is used to fuse the toner to the other side of the first recording material 511 along the first path 84. This completes the printing on second side of the first recording material 511 and also completes the double sided printing performed on the first recording material 511. In the same time, the pickup roller 92 picks up a third recording material 513 from the tray 80 and drives it to the first path 84 to continue the delivery process. By following the path of the recording material shown in FIGS. 4-7 to perform a double sided printing process, the present invention eliminates the need for stopping the recording material or waiting for the recording material to be delivered, thereby achieving a printing speed virtually equal to the one obtained for a single sided printing process.

In contrast to the conventional art, the present invention uses a switch device to allow the printer to perform a single sided printing or a double sided printing, and uses a special printing path to increase the speed of a double sided printing process. Preferably, the present invention eliminates the need for stopping the recording material and waiting for the previous printing medium to be printed, thereby achieving a double sided printing speed virtually equal to the one obtained for a single sided printing process.

Those skilled in the art will readily observe that numerous modifications and alterations of the device and method may be made while retaining the teachings of the invention.

What is claimed is:

1. A sheet feeding mechanism with duplex print function, comprising:
   a pickup roller for driving a recording material to a first path;
   a switch device, wherein the recording material proceeds from the first path to a second path or from a third path to a fourth path when the switch device is switched to a first position, and proceeds from the first path to the third path when the switch device is switched to a second position; and
   a gear set for driving the recording material from the first path to the third path when the switch device is switched to the second position and driving the recording material from the first path to the second path, from the third path to the fourth path, and from the fourth path to the first path when the switch device is switched to the first position.

2. The sheet feeding mechanism with duplex print function of claim 1, wherein the switch device is a switch gate.

3. The sheet feeding mechanism with duplex print function of claim 1, further comprising:
a sensor for determining whether the recording material detaches from the switch device and enters the third path; and
a control unit electrically connected to the sensor for controlling the gear set to drive the recording material from the third path to the fourth path according to the sensing result of the sensor and controlling the switch device to switch from the second position to the first position.

4. The sheet feeding mechanism with duplex print function of claim 1, wherein the gear set further comprises:
a first pinch roller installed in a rotatable manner on one side of the third path;
a second pinch roller installed in a rotatable manner on one side of the fourth path; and
a first capstan roller installed in a rotatable manner between the third path and the fourth path and connected to the first pinch roller and the second pinch roller, wherein the first capstan roller drives the first pinch roller and the second pinch roller.

5. The sheet feeding mechanism with duplex print function of claim 4, wherein the gear set further comprises:
a third pinch roller installed in a rotatable manner on one other side of the third path; and
a second capstan roller installed in a rotatable manner on the side of the third path and connected to the third pinch roller, wherein the second capstan roller drives the third pinch roller.

6. The sheet feeding mechanism with duplex print function of claim 4, wherein the gear set further comprises:
a fourth pinch roller installed in a rotatable manner on one other side of the fourth path;
a fifth pinch roller installed in a rotatable manner on one side of the first path; and
a third capstan roller installed in a rotatable manner between the first path and the fourth path and connected to the fourth pinch roller and the fifth pinch roller, wherein the third capstan roller drives the fourth pinch roller and the fifth pinch roller.

7. The sheet feeding mechanism with duplex print function of claim 1, wherein the gear set comprises a discharge roller installed in a rotatable manner on the second path for discharging the recording material away from the first path.

8. A printer with duplex print function, comprising:
a casing;
a pickup roller installed in the casing for driving a recording material to a first path;
a developing system installed in the casing for transferring toner to the recording material along the first path;
a toner fuser installed in the casing for fusing the toner on the recording material along the first path; and
a sheet feeding mechanism installed in the casing, wherein the sheet feeding mechanism further comprises:
a switch device, wherein the recording material proceeds from the first path to a second path or from a third path to a fourth path when the switch device is switched to a first position, and proceeds from the first path to the third path when the switch device is switched to a second position; and
a gear set for driving the recording material from the first path to the third path when the switch device is switched to the second position and driving the recording material from the first path to the second path, from the third path to the fourth path, and from the fourth path to the first path when the switch device is switched to the first position.

9. The printer with duplex print function of claim 8, further comprising a tray installed in the house according to a detachable manner for accommodating the recording material, wherein the pickup roller installed in a rotatable manner on top of the tray drives the recording material from the tray to the first path.

10. The printer with duplex print function of claim 8, further comprising a toner cartridge installed in the casing, wherein the toner cartridge comprises toner therein, and the developing system further comprises:
a developer roller installed on one side of the toner cartridge for picking up toner from the toner cartridge;
an organic photo conductor installed in a rotatable manner in the casing for picking up toner from the developer roller;
a charged roller installed in the casing for distributing charges on the organic photo conductor;
a transfer roller installed in the casing for transferring toner from the organic photo conductor to the recording material between the transfer roller and the organic photo conductor; and
a discharge unit installed in the casing for removing charges from the organic photo conductor.

11. The printer with duplex print function of claim 10, further comprising a laser scanning unit installed in the casing for projecting laser beams on the organic photo conductor.

12. The printer with duplex print function of claim 8, wherein the switch device is a switch gate.

13. The printer with duplex print function of claim 8, further comprising:
a sensor for determining whether the recording material detaches from the switch device and enters the third path; and
a control unit electrically connected to the sensor for controlling the gear set to drive the recording material from the third path to the fourth path according to the sensing result of the sensor and controlling the switch device to switch from the second position to the first position.

14. The printer with duplex print function of claim 8, wherein the gear set further comprises:
a first pinch roller installed in a rotatable manner on one side of the third path;
a second pinch roller installed in a rotatable manner on one side of the fourth path; and
a first capstan roller installed in a rotatable manner between the third path and the fourth path and connected to the first pinch roller and the second pinch roller, wherein the first capstan roller drives the first pinch roller and the second pinch roller.

15. The printer with duplex print function of claim 14, wherein the gear set further comprises:
a third pinch roller installed in a rotatable manner on one other side of the third path; and
a second capstan roller installed in a rotatable manner on the side of the third path and connected to the third pinch roller, wherein the second capstan roller drives the third pinch roller.

16. The printer with duplex print function of claim 14, wherein the gear set further comprises:
a fourth pinch roller installed in a rotatable manner on one other side of the fourth path;
a fifth pinch roller installed in a rotatable manner on one side of the first path; and
a third capstan roller installed in a rotatable manner between the first path and the fourth path and connected to the fourth pinch roller and the fifth pinch roller, wherein the third capstan roller drives the fourth pinch roller and the fifth pinch roller.

17. The printer with duplex print function of claim 8, wherein the gear set comprises a discharge roller installed in a rotatable manner on the second path for discharging the recording material away from the first path.

* * * * *